No. 858,945. PATENTED JULY 2, 1907.
G. BERNHARDT.
SCOURING TABLE.
APPLICATION FILED JAN. 3, 1907.

Inventor
George Bernhardt

Witnesses
Frank B. Hoffman
K. Allen

By Victor J. Evans
Attorney

UNITED STATES PATENT OFFICE.

GEORGE BERNHARDT, OF ELMHURST, ILLINOIS.

SCOURING-TABLE.

No. 858,945.  Specification of Letters Patent.  Patented July 2, 1907.

Application filed January 3, 1907. Serial No. 350,602.

*To all whom it may concern:*

Be it known that I, GEORGE BERNHARDT, a citizen of the United States, residing at Elmhurst, in the county of Dupage and State of Illinois, have invented new and useful Improvements in Scouring-Tables, of which the following is a specification.

This invention relates to an improvement in scouring tables for cutlery and the like, comprehending specifically a table for supporting the articles to be scoured, and a holder for securing the articles in proper position on the table.

The main object of the present invention is the production of a scouring table and a cutlery holder movably connected therewith, said holder serving to normally hold the articles to present one side thereof in scouring position on the table, and being reversible to conveniently present the opposite side of the articles in scouring position.

Figure 1:
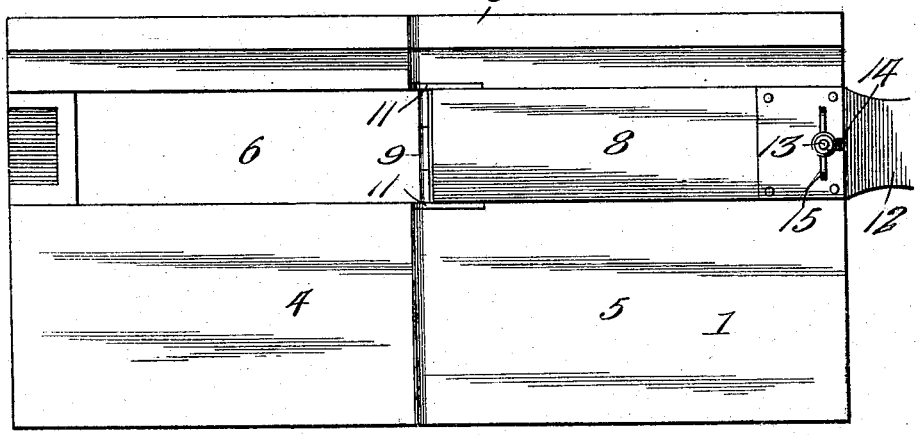
Figure 2:
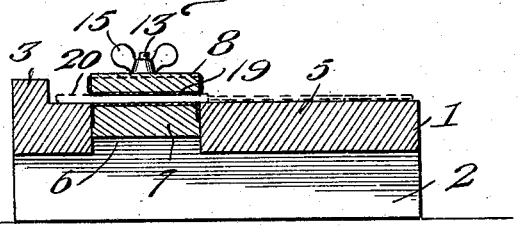
Figure 3:
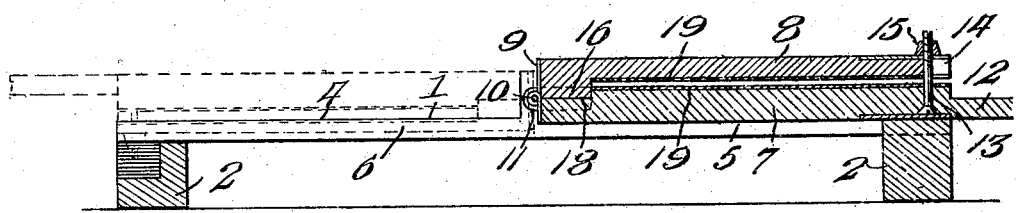

The invention will first be described in the following specification, reference being had to the accompanying drawing, in which:

Figure 1 is a plan view of a scouring table constructed in accordance with my invention. Fig. 2 is a transverse section of the same. Fig. 3 is a longitudinal section of the same, the holder being shown in reversed position in dotted outline.

Referring particularly to the drawings, my improved scouring table comprises a platform or table proper 1, which may be of any size desired, and is preferably supported on end-strips or cross-bars 2, as shown. The table is preferably provided along one side edge with a projecting rib 3, while approximately one-half the table is reduced in thickness to provide sections 4 and 5 having different surface planes. Adjacent the rib 3, the table is formed with a longitudinally extending slot or channel 6, in which the holder is arranged for movement, said channel opening entirely through the table proper, as is apparent from the drawings.

The holder comprises coöperating clamping members 7 and 8, the latter of less thickness than the former, and both approximating in width the width of the channel 6. The members are hingedly connected together through the medium of bracket-plates 9 and pivot pin 10, the latter terminally seating in bearing plates 11 in the walls of the channel at a point midway the length of the latter, whereby the clamping members have a hinge connection with each other and a pivoted connection with the table. One of the clamping members, as 7, is preferably extended beyond the other in the form of a handle 12, being also provided with a relatively fixed screw bolt 13, designed, when the members are in superimposed or operative relation to enter a slot 14 in the end of the other member and be terminally engaged by a thumb nut 15 to secure the members in clamping position. The clamping member 8 is formed adjacent the hinge connection with an off-set 16 adapted to enter a recess 18 formed in the opposing member, whereby to limit movement of the members toward each other and maintain them normally spaced, as shown. The proximate surfaces of the clamping members are covered by a protective strip 19 of chamois or the like, to avoid marring of the articles held thereby.

In use a number of articles to be scoured or cleaned, as knives 20, are secured between the clamping members of the holder, the thumb nut being set to insure the clamping operation, the handles of the articles being clamped by the members with the blades projecting over one of the table sections, as 4. With the holder in one position, as shown in Fig. 4, the blades of the knives will rest directly upon the table section, as 4, and may be readily and conveniently scoured or cleaned. Having cleaned one side of the blades presented, the holder is swung on its pivotal support to present the opposite side of the respective blades uppermost, the blades in the position resting upon section 5 of the table. The holder will then secure the desired articles in a manner to prevent their independent movement and to present their surfaces for ready cleaning and scouring, the reversal of the holder permitting the cleaning of both surfaces of the articles without removing them from the holder. The free end of the holder proper rests when in operative position, upon the end strips 3, one of the latter being recessed at 21, to receive the thumb nut 15 when the holder is arranged in the position shown in dotted lines in Fig. 3. The clamping member 8 is preferably provided with a wear plate 22 to overlie the slot 14, and prevent wear of the parts during operation of the thumb nut.

Having thus described the invention, what I claim is:

1. A scouring table, comprising a table proper, and an article holder connected with the table and reversible to arrange said holder in operative relation to different sections of the table.

2. A scouring table formed with a longitudinal channel, and a holder comprising clamping members hinged together at one end, and means for clamping the opposite ends of said members together, said holder being pivotally supported within and approximately midway the length of the channel.

In testimony whereof, I affix my signature in presence of two witnesses.

GEORGE BERNHARDT.

Witnesses:
 ALONZO G. FISCHER,
 GEO. H. FISCHER.